United States Patent
Cavaliere et al.

(10) Patent No.: US 10,826,615 B2
(45) Date of Patent: Nov. 3, 2020

(54) OPTICAL TRANSMISSION METHOD AND OPTICAL RECEIVER APPARATUS FOR DETERMINING RECEIVED SYMBOLS FROM A RECEIVED ELECTRICAL SIGNAL USING AN INDICATION OF A NONLINEAR IMPULSE RESPONSE OF THE DIRECT DETECTION AND WITHOUT PERFORMING EQUALIZATION FOLLOWING THE DIRECT DETECTION

(71) Applicant: Telefonaktiebolaget LM Ericsson (publ), Stockholm (SE)

(72) Inventors: Fabio Cavaliere, Pisa (IT); Antonio Malacarne, Pisa (IT); Tommaso Foggi, Pisa (IT); Francesco Fresi, Pisa (IT); Gianluca Meloni, Pisa (IT); Luca Poti, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/461,036

(22) PCT Filed: Dec. 2, 2016

(86) PCT No.: PCT/EP2016/079624
§ 371 (c)(1),
(2) Date: May 15, 2019

(87) PCT Pub. No.: WO2018/099573
PCT Pub. Date: Jun. 7, 2018

(65) Prior Publication Data
US 2019/0312648 A1    Oct. 10, 2019

(51) Int. Cl.
*H04B 10/54* (2013.01)
*H04B 10/69* (2013.01)
*H04B 10/25* (2013.01)

(52) U.S. Cl.
CPC .......... *H04B 10/541* (2013.01); *H04B 10/25* (2013.01); *H04B 10/695* (2013.01)

(58) Field of Classification Search
CPC .......... H04B 10/516–5161; H04B 10/54–541; H04B 10/25–2572; H04B 10/69–6973; H04B 10/66–6973
See application file for complete search history.

(56) References Cited

U.S. PATENT DOCUMENTS 7,418,212 B1 *  8/2008  Bontu .................. H04L 25/061
                                                375/232
2014/0363173 A1 * 12/2014 Dave .................. H04B 10/25137
                                                398/149

FOREIGN PATENT DOCUMENTS

WO    2015027903 A1    3/2015
WO    2015188855 A1   12/2015

OTHER PUBLICATIONS

Chung, Wonzoo, "Channel Estimation Methods Based on Volterra Kernels for MLSD in Optical Communication Systems", IEEE Photonics Technology Letters, vol. 22, No. 4, Feb. 15, 2010, pp. 224-226.

(Continued)

*Primary Examiner* — Casey L Kretzer
(74) *Attorney, Agent, or Firm* — Murphy, Bilak & Homiller, PLLC

(57) ABSTRACT

An optical transmission method (10) comprising steps of receiving (12) a communication signal comprising symbols for transmission. The method comprises performing (16) linear amplitude modulation of an optical carrier with the communication signal to generate an amplitude modulated optical carrier. The method comprises performing low-pass filtering (14) to reduce a bandwidth of the symbols to less than a Nyquist bandwidth of the symbols. The method comprises transmitting (18) the amplitude modulated optical (Continued)

carrier. The method further comprises receiving (20) the amplitude modulated optical carrier following transmission and performing direct detection of the received amplitude modulated optical carrier to generate a received electrical signal; and determining (22) received symbols from the received electrical signal using an indication of a nonlinear impulse response of the direct detection.

11 Claims, 10 Drawing Sheets

(56) References Cited

OTHER PUBLICATIONS

Colavolpe, Giulio, et al., "Time-Frequency Packing for High-Capacity Coherent Optical Links", IEEE Transactions on Communications, vol. 62, No. 8, Aug. 2014, pp. 2986-2995.
Fresi, Francesco, et al., "Impact of Optical and Electrical Narrowband Spectral Shaping in Faster than Nyquist Tb Superchannel", IEEE Photonics Technology Letters, vol. 25, No. 23, Dec. 1, 2013, pp. 2301-2303.
Secondini, Marco, et al., "Optical Time—Frequency Packing: Principles, Design, Implementation, and Experimental Demonstration", Journal of Lightwave Technology, vol. 33, No. 17, Sep. 1, 2015, pp. 3558-3570.
Zhu, Xianming, et al., "Electronic Dispersion Compensation Based on Maximum-Likelihood Sequence Estimation for 10 Gb/s Fiber-Optic Communication Systems", Leos Summer Topical Meetings, 2007 Digest of the IEEE, PI, Jul. 1, 2007, pp. 59-60.

\* cited by examiner

OPTICAL TRANSMISSION METHOD AND OPTICAL RECEIVER APPARATUS FOR DETERMINING RECEIVED SYMBOLS FROM A RECEIVED ELECTRICAL SIGNAL USING AN INDICATION OF A NONLINEAR IMPULSE RESPONSE OF THE DIRECT DETECTION AND WITHOUT PERFORMING EQUALIZATION FOLLOWING THE DIRECT DETECTION

TECHNICAL FIELD

The disclosure relates to an optical transmission method and to optical receiver apparatus for an optical transmission system.

BACKGROUND

The demand for high capacity (100 Gbit/s and beyond) and short reach (100 m-1 km) optical connections is increasing, due to increasing numbers of connected servers, storage units and switches in data centres, and due to the need for higher interconnection speeds in 5G radio access network, RAN, equipment. In these cases, it would be desirable to use low bandwidth transmitters and receivers, realized with cost effective optical and electrical technology. This is the reason why spectrally efficient multi-level modulation formats are being introduced, such as PAM-4, pulse amplitude modulation with four amplitude levels. For example, a 400 Gbit/s interconnection system can be realized with PAM-4, by wavelength multiplexing four 50 Gbit/s optical channels on a single output optical fibre, doubling the spectral efficiency, i.e. ratio between bit rate and transmission bandwidth, compared to the on-off keying, OOK, modulation format.

Better spectral efficiency and/or performance can be obtained by using more sophisticated modulation techniques, such as dual-polarisation quadrature phase shift keying, DP-QPSK, 16-state quadrature amplitude modulation, 16-QAM, or time-frequency packing, as reported in M. Secondini et al "Optical Time-Frequency Packing: Principles, Design, Implementation, and Experimental Demonstration", Journal of Lightwave technology, vol. 33, no. 17, Sep. 1, 2015. However, the significant increase in complexity and cost incurred through using such modulation techniques is not desirable for interconnection systems. The main cost sources that make higher performance coherent systems, such as DP-QPSK, 16-QAM, and time-frequency packing, TFP, not necessarily suited for use in interconnection systems include the requirement for an IQ modulator at the transmitter, a local oscillator at the receiver and complex digital signal processing, DSP, for signal equalization and channel estimation at the receiver.

While the use of multi-level modulation formats, like PAM-4, improves spectral efficiency compared to binary modulation, it also introduces a power penalty, of approximately 4 dB and 8 for PAM-4 and PAM-8, respectively, due to the difficulty of discriminating signal levels from noise. Practical implementation issues, such as narrow modulation and receiver bandwidth, and distortion introduced by electronics at the transmitter and at the receiver, further reduce the achievable link budget, which in practical 100 Gbit/s systems is less than 5 dB.

SUMMARY

It is an object to provide an improved optical transmission method. It is a further object to provide an improved optical receiver apparatus for an optical transmission system.

In one aspect, the disclosure provides an optical transmission method comprising steps as follows. In one step the method comprises receiving a communication signal comprising symbols for transmission. In another step the method comprises performing amplitude modulation of an optical carrier with the communication signal to generate an amplitude modulated optical carrier. In another step the method comprises performing low-pass filtering to reduce a bandwidth of the symbols to less than a Nyquist bandwidth of the symbols. In another step the method comprises transmitting the amplitude modulated optical carrier. In another step the method comprises receiving the amplitude modulated optical carrier following transmission and performing direct detection of the received amplitude modulated optical carrier to generate a received electrical signal. In another step the method comprises determining received symbols from the received electrical signal using an indication of a nonlinear impulse response of the direct detection.

This method exploits simple amplitude modulation and direct detection, and requires no frequency or phase estimation and no equalization to be performed following direct detection. In respect of both transmission and receiving, this method may therefore be considered much simpler than a coherent system using TFP with DP-QPSK modulation format, such as reported by M. Secondini et al (ibid).

This method may also provide a significant performance improvement compared to alternative implementations, such as PAM-4. The required bandwidth for this method is comparable, allowing use of low cost optical and electronic devices. For example, amplitude modulation can be performed by cost effective direct modulated lasers like VCSELs, and the direct detection may be performed using, for example, a common photodiode. Moreover, the absence of electrical equalization makes the method energy efficient.

In another aspect, the disclosure provides a method of receiving an amplitude modulated optical carrier. The amplitude modulated optical carrier carrying a communication signal comprising symbols and having a bandwidth less than a Nyquist bandwidth of the symbols. The method comprises performing direct detection of the received amplitude modulated optical carrier to generate a received electrical signal. The method further comprises determining received symbols from the received electrical signal using an indication of a nonlinear impulse response of the direct detection.

In another aspect, the disclosure provides optical receiver apparatus for an optical transmission system. The optical receiver apparatus comprises a photodiode and symbol determination apparatus. The photodiode is configured to receive an amplitude modulated optical carrier and is configured to perform direct detection of the received amplitude modulated optical carrier to generate a received electrical signal. The amplitude modulated optical carrier carries a communication signal comprising symbols and has a bandwidth less than a Nyquist bandwidth of the symbols. The symbol determination apparatus is configured to determine received symbols from the received electrical signal using an indication of a nonlinear impulse response of the photodiode.

This optical receiver apparatus exploits simple direct detection of an amplitude modulated signal and requires no frequency or phase estimation and no equalization to be performed following direct detection. This optical receiver apparatus may therefore be considered much simpler than a coherent system using TFP with DP-QPSK modulation format, such as reported by M. Secondini et al (ibid).

This optical receiver apparatus may also provide a significant performance improvement compared to alternative implementations, such as PAM-4. The required bandwidth for this method is comparable, allowing use of low cost optical and electronic devices. For example, the direct detection is performed using a common photodiode. Moreover, the absence of electrical equalization following direct detection makes the apparatus energy efficient.

In another aspect, the disclosure provides optical transmitter apparatus comprising an input, an electro-optic modulator and low-pass filtering apparatus. The input is configured to receive a communication signal comprising symbols for transmission. The electro-optic modulator configured to perform amplitude modulation of an optical carrier with the communication signal to generate an amplitude modulated optical carrier. The low-pass filtering apparatus is configured to perform low-pass filtering to reduce a bandwidth of the symbols to less than a Nyquist bandwidth of the symbols.

In another aspect, the disclosure provides an optical transmitter for transmitting a communication signal comprising symbols for transmission. The optical transmitter comprises processing circuitry. The processing circuitry is configured to control amplitude modulation of an optical carrier with the communication signal, to generate an amplitude modulated optical carrier. The processing circuitry is additionally configured to control low-pass filtering to reduce a bandwidth of the symbols to less than a Nyquist bandwidth of the symbols.

In another aspect, the disclosure provides an optical receiver for receiving an amplitude modulated optical carrier carrying a communication signal. The communication signal comprises symbols and has a bandwidth less than a Nyquist bandwidth of the symbols. The optical receiver comprises processing circuitry. The processing circuitry is configured to control direct detection of the amplitude modulated optical carrier to generate a received electrical signal. The processing circuitry is additionally configured to determine received symbols from the received electrical signal using an indication of a nonlinear impulse response of the direct detection.

In another aspect, the disclosure provides a computer program, comprising instructions which, when executed on at least one processor, cause the at least one processor to perform any of the above steps of the optical transmission method.

In another aspect, the disclosure provides a data carrier having computer readable instructions embodied therein. The said computer readable instructions are for providing access to resources available on a processor. The computer readable instructions comprise instructions to cause the processor to perform any of the above steps of the optical transmission method.

BRIEF DESCRIPTION OF THE DRAWINGS

Embodiments of the disclosure will now be described, by way of example only, with reference to the accompanying drawings.

DETAILED DESCRIPTION

The same reference numbers will be used for corresponding features in different embodiments.

Figure 1:
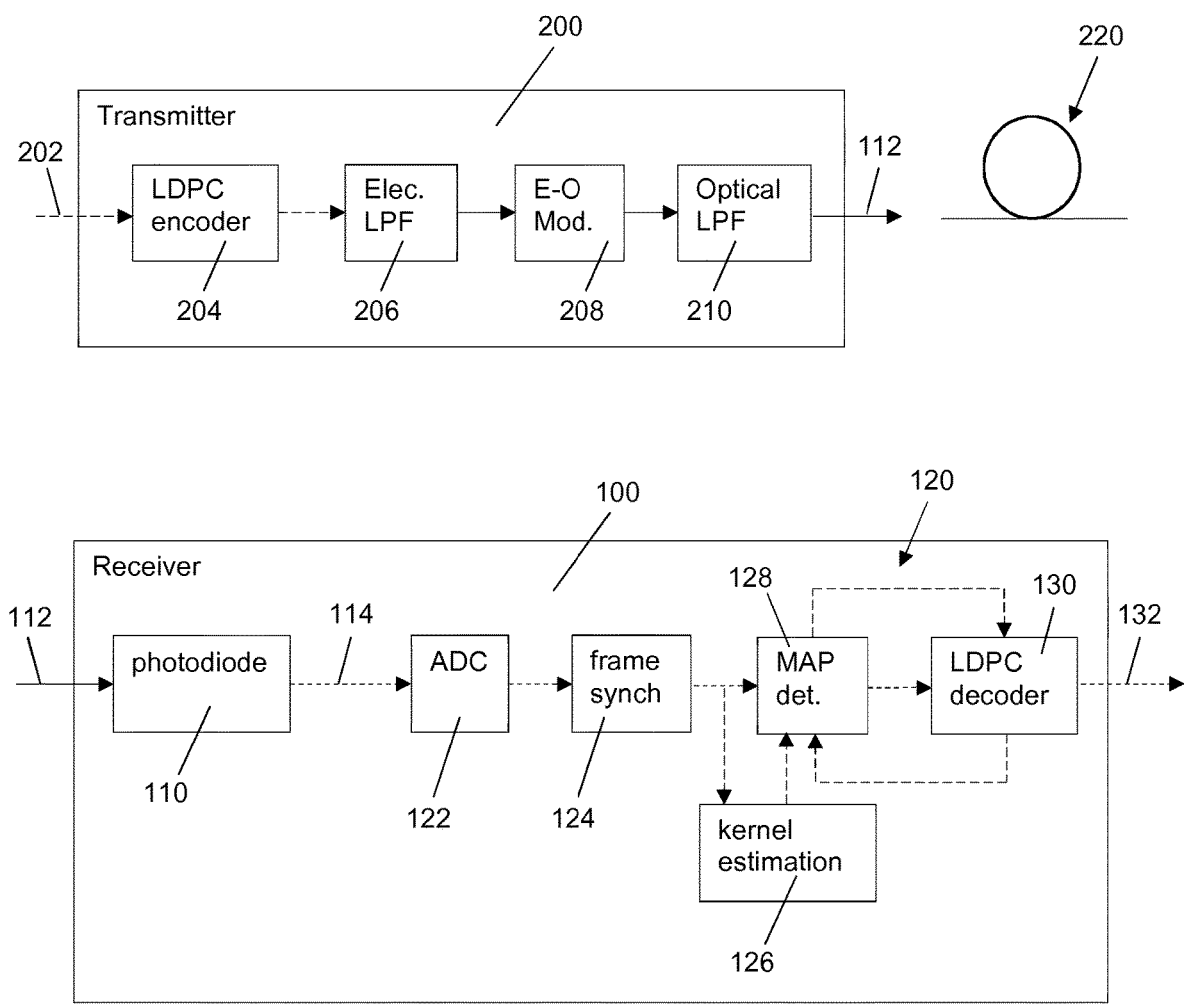
FIG. 1 illustrates a transceiver scheme according to an embodiment of the disclosure.

The disclosure provides a transceiver scheme 100, 200, 220 as illustrated in FIG. 1. The transceiver scheme is based on time-frequency-packing, TFP, modulation applied to an intensity (amplitude) modulation/direct detection, IM/DD, transmission scheme.

The transceiver scheme comprises optical transmitter apparatus 200 and optical receiver apparatus 100, connected by an optical fibre link 220. As will be appreciated by the skilled person, optical transmitter apparatus 200 and optical receiver apparatus 100 may be provided together as an optical transceiver apparatus, at each end of an optical fibre link 220.

The optical transmitter apparatus 200 comprises a forward error correction, FEC, encoder 204, an electrical low pass filter, LPF, 206, an electro-optic, E-O, modulator, 208, and an optical LPF 210.

The FEC encoder used in this example takes the form of a low-density-parity-check, LDPC encoder 204, configured to receive a communication signal 202 comprising symbols for transmission. LDPC code is a linear error correcting code and it will be understood that the FEC encoder may be configured to perform an alternative linear error correcting code, such as a Turbo code. The electrical LPF 206 is configured to low-pass filter the symbols to reduce a bandwidth of the symbols to less than a Nyquist bandwidth of the symbols. The E-O modulator 208 is configured to perform amplitude modulation of an optical carrier with the low-pass filtered symbols to generate an amplitude modulated optical carrier 112. The E-O modulator may, for example, be a direct modulated laser, such as a vertical cavity side emitting laser, VCSEL. In some examples, the optical carrier may be generated (e.g. by a laser) and then modulated, or an optical carrier generator (e.g. laser) is directly modulated to generate the amplitude modulated optical carrier. Either method may be referred to as performing amplitude modulation of an optical carrier, e.g. performing linear amplitude modulation of an optical carrier. The optical LPF 210 is configured to low-pass filter the amplitude modulated optical carrier to reduce its optical bandwidth, since the E-O modulator (e.g.

VCSEL) may have a low modulation bandwidth. The optical LPF 210 is therefore configured to perform additional low-pass filtering to reduce a bandwidth of the symbols to less than a Nyquist bandwidth of the symbols. That is to say, in this transceiver scheme the electrical LPF and the optical LPF together perform the low-pass filtering to reduce the bandwidth of the symbols to less than the Nyquist bandwidth of the symbols.

The optical receiver apparatus 100 comprises an optical detector, configured to convert an optical signal to an electrical signal, e.g. a photodiode 110. The optical receiver apparatus 100 further comprises an analog to digital conversion, ADC, apparatus 122, frame synchronisation apparatus 124 and symbol determination apparatus 120, 126.

The photodiode 110 is configured to receive an amplitude modulated optical carrier 112 following transmission across the optical link 220, and is configured to perform direct detection of the received amplitude modulated optical carrier to generate a received electrical signal 114. The ADC 122 is configured to perform analog to digital conversion of the received electrical signal 114; the ADC 122 is configured to sample the received electrical signal at a sampling rate of one sample per symbol.

The symbol determination apparatus in this example comprises an iterative decoder 120 and kernel estimation apparatus 126. The iterative decoder 120 is configured to determine received symbols from the received electrical signal using an indication of the nonlinear impulse response of the photodiode, provided by the kernel estimation apparatus 126. The iterative decoder 120 comprises, for example, a maximum a posteriori probability, MAP, detector 128 and a FEC decoder, for example, an LDPC decoder 130. The decoder 130 is configured to determine and output received symbols 132.

Other types of detector and decoder may be used, for example, a maximum likelihood sequence, MLS, detector may be used instead of the MAP detector 128. The FEC decoder is configured to decode the FEC used in transmission, e.g. if a Turbo encoder is used in the transmitter apparatus, a Turbo decoder will be used in place of the LDPC decoder 130 in the receiver apparatus.

The direct detection makes the transceiver scheme non-linear, due to the photodiode 110 having a quadratic transfer function. A calculation is made of an indication of a non-linear impulse response of the photodiode for channel estimation. In this example, Volterra kernel coefficients are used for the channel estimation, according to the method reported in W. Chung, "Channel estimation methods based on Volterra kernels for MLSD in optical communication systems," Photonics Technology Letters, IEEE, vol. 22, no. 4, pp. 224-226, 2010.

If L is the channel memory length including the current transmitted symbol, L·(L+1)/2 Kernel coefficients (Kernel's dimension) need to be estimated in order to determine the current transmitted symbol. This is because each coefficient depends on two symbols, due to the channel non-linearity caused by the photodiode, and because the coefficients have a Hermitian symmetry (otherwise their number would be L·L). In some examples, the channel estimation requires a training sequence, typically hundreds of symbols long.

By using the estimated Kernel coefficients for the nonlinear impulse response of the photodiode, it is possible to calculate $2^L$ received waveforms (one for each possible transmitted bit sequence, i.e. symbol) that are then used by the iterative decoder in order to determine the actual transmitted symbol.

Compared to a coherent receiver, neither frequency and phase estimation nor equalization are needed, making the receiver apparatus 100 energy efficient.

Therefore, at the transmitter 200, the transceiver relies on amplitude modulation that can be performed by cost effective direct modulated lasers, and at the receiver, only a photodiode 122 is necessary for detection, as in common non-return-to-zero, NRZ, systems.

One advantage of this transceiver scheme based on intensity modulated direct detection frequency packing is a significant performance improvement compared to alternative implementations, e.g. PAM-4. The required bandwidth is comparable, allowing to use low cost optical and electronic devices. For example, amplitude modulation can be performed by a direct modulated laser, e.g. VCSELs. Moreover, the absence of electrical equalization makes the solution energy efficient.

Another advantage of this transceiver scheme is the removal of the IQ modulator, local oscillator and DSP associated with the use of higher performance coherent systems, such as DP-QPSK, 16-QAM, and TFP, so that it is possible to provide an improved performance compared to traditional solutions like PAM-4, at an acceptable cost.

In use, the transceiver scheme illustrated in FIG. 1 enables optical transmission comprising receiving symbols for transmission; performing time-frequency-packing, TFP, modulation of an optical carrier with the symbols to generate a modulated optical carrier; transmitting the modulated optical carrier through an optical link; receiving the modulated optical carrier; and performing direct detection of the modulated optical carrier to generate a received electrical signal. Received symbols may then be determined from the received electrical signal using an indication of a nonlinear impulse response of the direct detection.

It will be understood that the term symbol refers to data or data bits which have been mapped onto a symbol for transmission. The embodiments of the disclosure may therefore equally be considered as applying to data or data bits. For example, the transmitter is configured to receive data or data bits for transmission, and the receiver is configured to output data or data bits.

Figure 2:
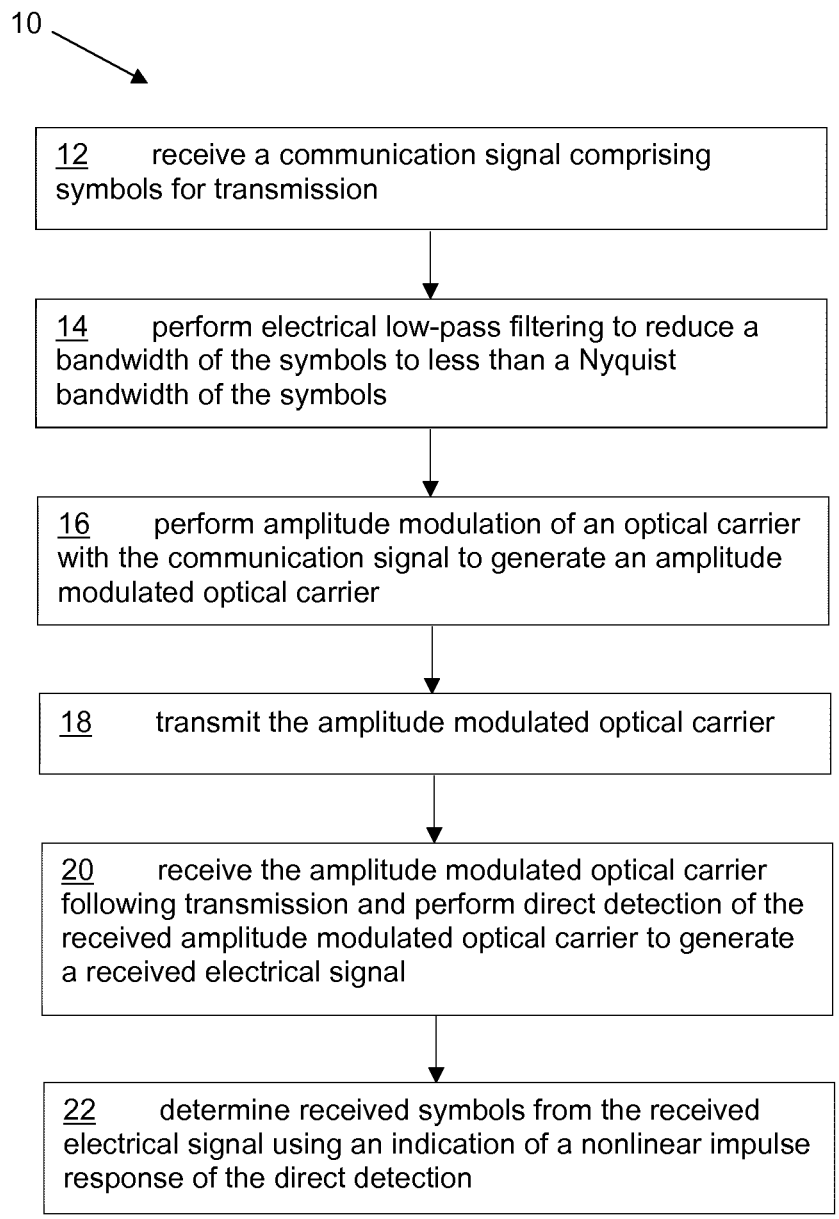
FIG. 2 illustrates steps of an optical transmission method according to an embodiment of the disclosure.

FIG. 2 illustrates steps of an optical transmission method 10 according to an embodiment of the disclosure. The method comprises: receiving 12 a communication signal comprising symbols for transmission; performing electrical low-pass filtering 14 to reduce a bandwidth of the symbols to less than a Nyquist bandwidth of the symbols; performing 16 amplitude modulation of an optical carrier with the communication signal to generate an amplitude modulated optical carrier; transmitting 18 the amplitude modulated optical carrier; receiving 20 the amplitude modulated optical carrier following transmission and performing direct detection of the received amplitude modulated optical carrier to generate a received electrical signal; and determining 22 received symbols from the received electrical signal using an indication of a nonlinear impulse response of the direct detection.

Referring to the transceiver scheme of FIG. 1: the steps of receiving 12 the communication signal, performing low-pass filtering 14 and performing 16 amplitude modulation of an optical carrier with the communication signal will be performed at the transmitter apparatus 200; the amplitude modulated optical carrier will be transmitted 18 across the optical fibre link 220; and the steps of receiving 20 the amplitude modulated optical carrier, performing direct detection, and determining 22 received symbols will be performed at the receiver apparatus 100.

Figure 3:
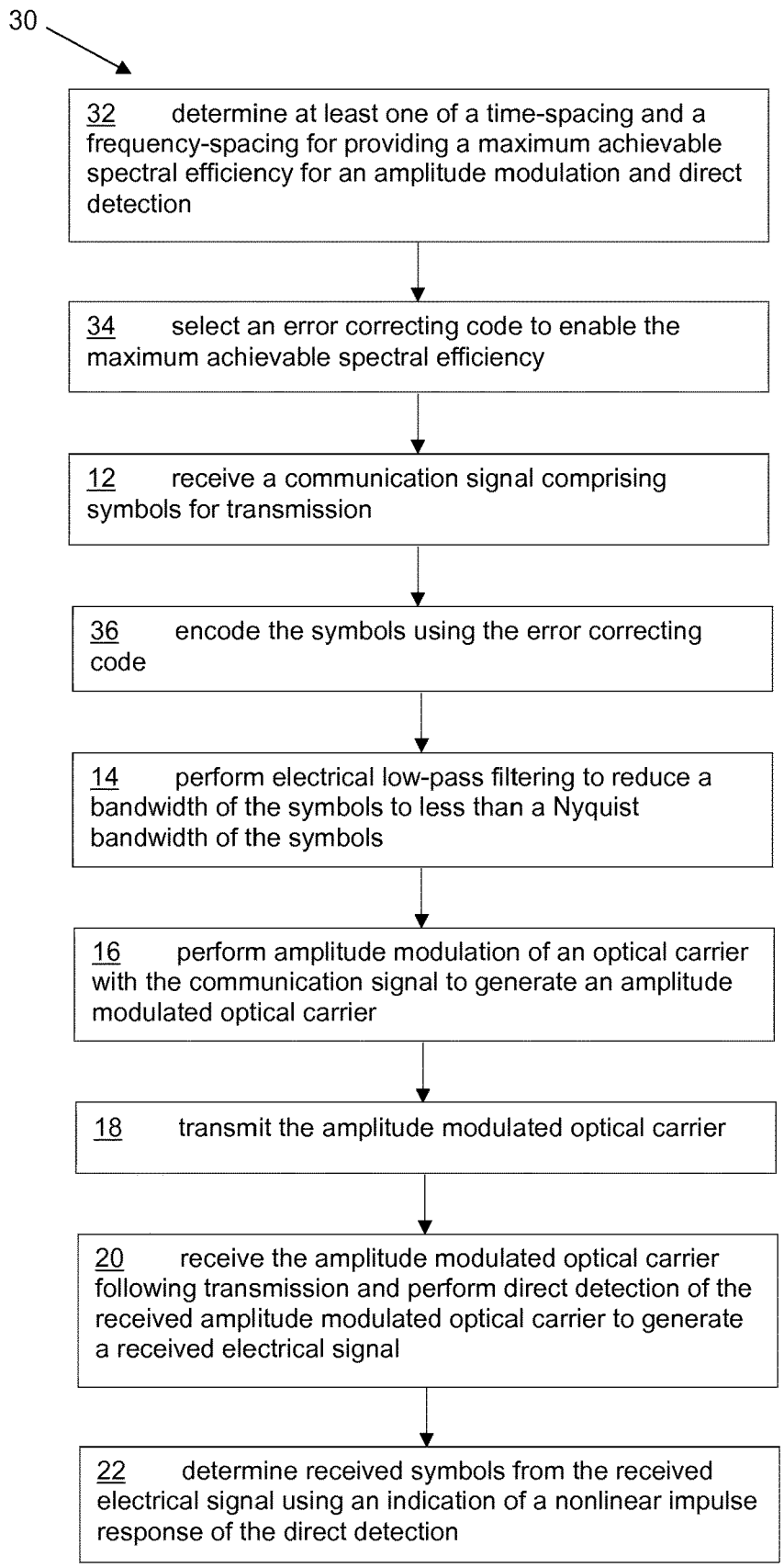
FIG. 3 illustrates steps of an optical transmission method according to an embodiment of the disclosure.

FIG. 3 illustrates steps of an optical transmission method 30 according to an embodiment of the disclosure. The method 30 of this embodiment corresponds to the method 10 illustrated in FIG. 2, with the addition of the following steps.

The method 30 additionally includes determining 32 at least one of a time-spacing and a frequency-spacing for providing a maximum achievable spectral efficiency for a chosen amplitude modulation and direct detection transmission scheme. An error correcting code is then selected 34 to enable the maximum achievable spectral efficiency. In 36, the symbols are encoded using the selected error correcting code. After receiving 12 the symbols for transmission, the symbols are encoded using the error correcting code.

The method 30 of this embodiment is may therefore be considered as a method of optical transmission based on time-frequency-packing, TFP, modulation applied to an intensity modulated direct detection, IM/DD, optical transmission system.

Figure 4:
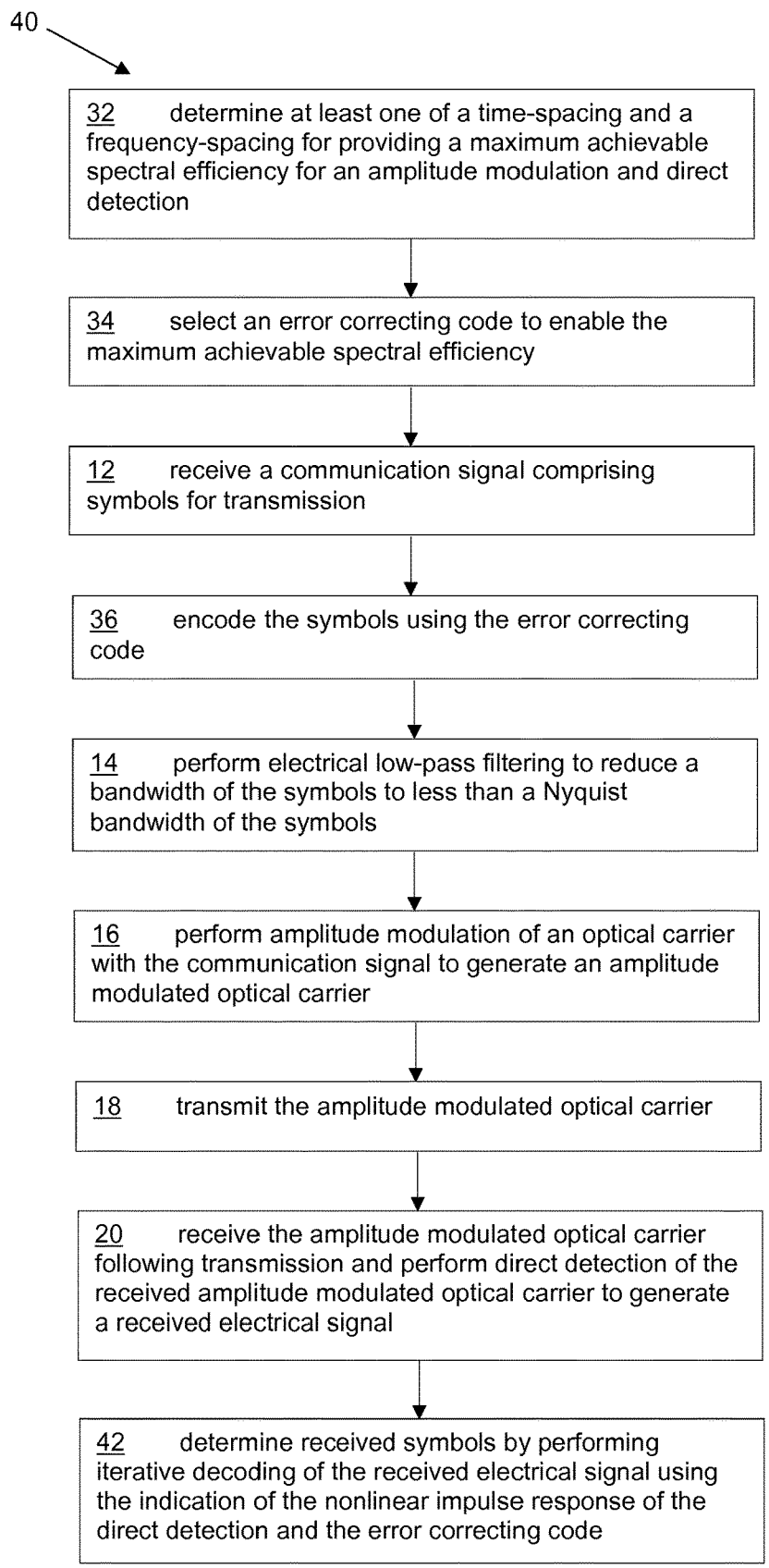
FIG. 4 illustrates steps of an optical transmission method according to an embodiment of the disclosure.

FIG. 4 illustrates steps of an optical transmission method 40 according to an embodiment of the disclosure. The method 40 of this embodiment corresponds to the method 30 illustrated in FIG. 3, with the following addition.

In this embodiment, determining the received symbols comprises performing 42 iterative decoding of the received electrical signal using the indication of the nonlinear impulse response of the direct detection and the same error correcting code as used for encoding 36 the symbols.

Figure 5:
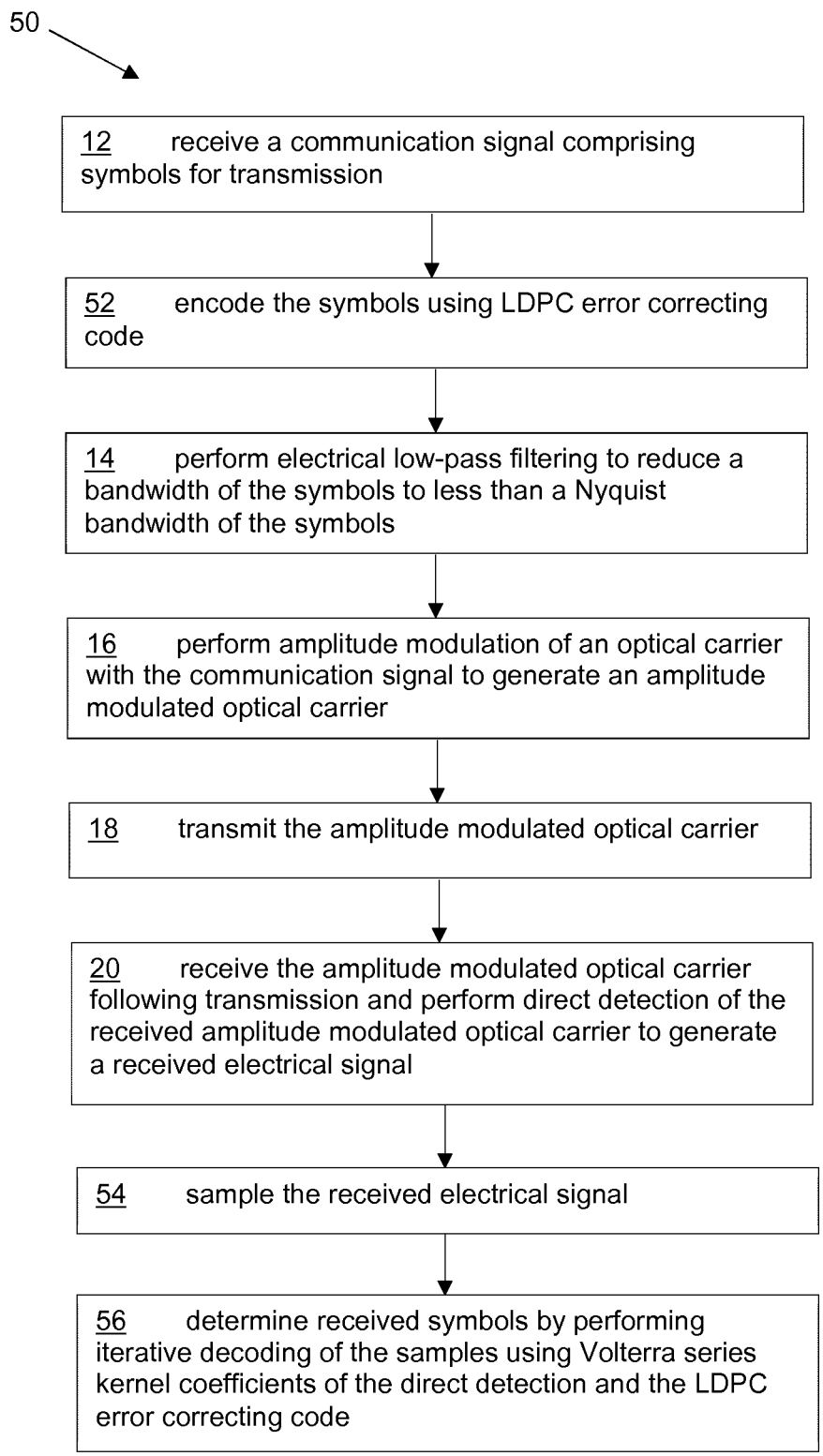
FIG. 5 illustrates steps of an optical transmission method according to an embodiment of the disclosure.

FIG. 5 illustrates steps of an optical transmission method 50 according to an embodiment of the disclosure. The method 50 of this embodiment corresponds to the method 10 illustrated in FIG. 2, with the following modifications.

In this embodiment, the symbols are encoded 52 using an LDPC error correcting code. It will be appreciated that LDPC is a linear error correcting code and an alternative linear error correcting code, such as a Turbo code, may be used instead.

The indication of the nonlinear impulse response of the direct detection comprises coefficients of the nonlinear impulse response of the direct detection; in this embodiment, the coefficients are Volterra series kernel coefficients.

The method 50 additionally comprises sampling 54 the received electrical signal. Determining the received symbols comprises performing 56 iterative decoding of the samples using Volterra series kernel coefficients of the direct detection and the LDPC error correcting code used for the encoding 52. The iterative decoding may, for example, comprise MAP or MLS detection and LDPC decoding.

In an embodiment, the nonlinear impulse response of the direct detection is based on two consecutive transmitted symbols. When the nonlinear impulse response comprises Kernel coefficients, these are estimated based on the channel impulse response to two consecutive transmitted symbols.

Figure 6:
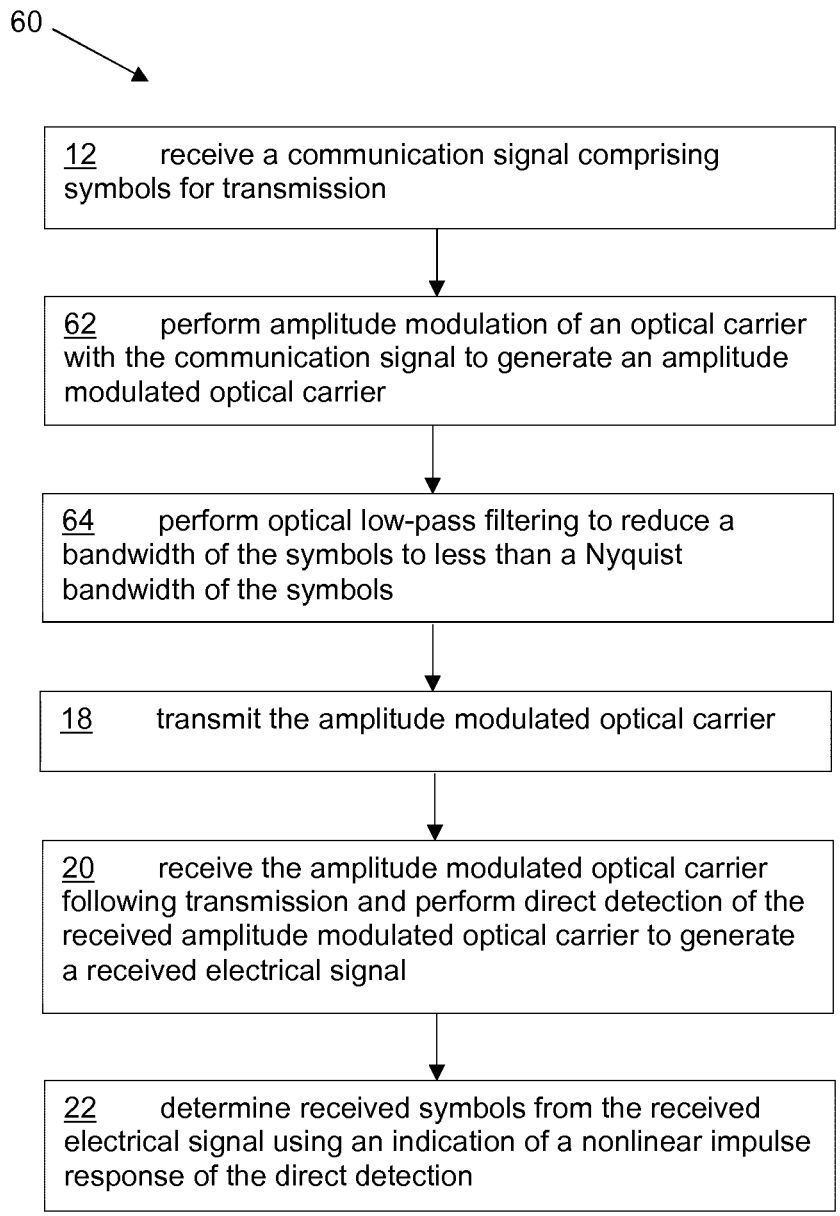
FIG. 6 illustrates steps of an optical transmission method according to an embodiment of the disclosure.

FIG. 6 illustrates steps of an optical transmission method 60 according to an embodiment of the disclosure. The method 60 is similar to the method 10 illustrated in FIG. 2 with the modification that the low-pass filtering of this embodiment is optical low-pass filtering.

The method comprises: receiving 12 a communication signal comprising symbols for transmission; performing 62 amplitude modulation of an optical carrier with the communication signal to generate an amplitude modulated optical carrier; performing optical low-pass filtering 64 to reduce a bandwidth of the symbols to less than a Nyquist bandwidth of the symbols; transmitting 18 the amplitude modulated optical carrier; receiving 20 the amplitude modulated optical carrier following transmission and performing direct detection of the received amplitude modulated optical carrier to generate a received electrical signal; and determining 22 received symbols from the received electrical signal using an indication of a nonlinear impulse response of the direct detection.

Referring to the transceiver scheme of FIG. 1: the steps of receiving 12 the communication signal, performing 62 amplitude modulation of an optical carrier with the communications signal, and performing optical low-pass filtering be performed at the transmitter apparatus 200.

Each of the methods 30, 40, 50 described with reference to FIGS. 3 to 5 may be similarly modified to replace electrical low-pass filtering 14 with optical low-pass filtering 64.

Each of the methods 30, 40, 50 described with reference to FIGS. 3 to 5 may be also be modified to perform both optical low-pass filtering 64 and electrical low-pass filtering 14, which together result in low-pass filtering to reduce the bandwidth of the symbols to less than the Nyquist bandwidth of the symbols.

Corresponding embodiments are also applicable to the method of receiving an amplitude modulated optical carrier described below.

Figure 7:
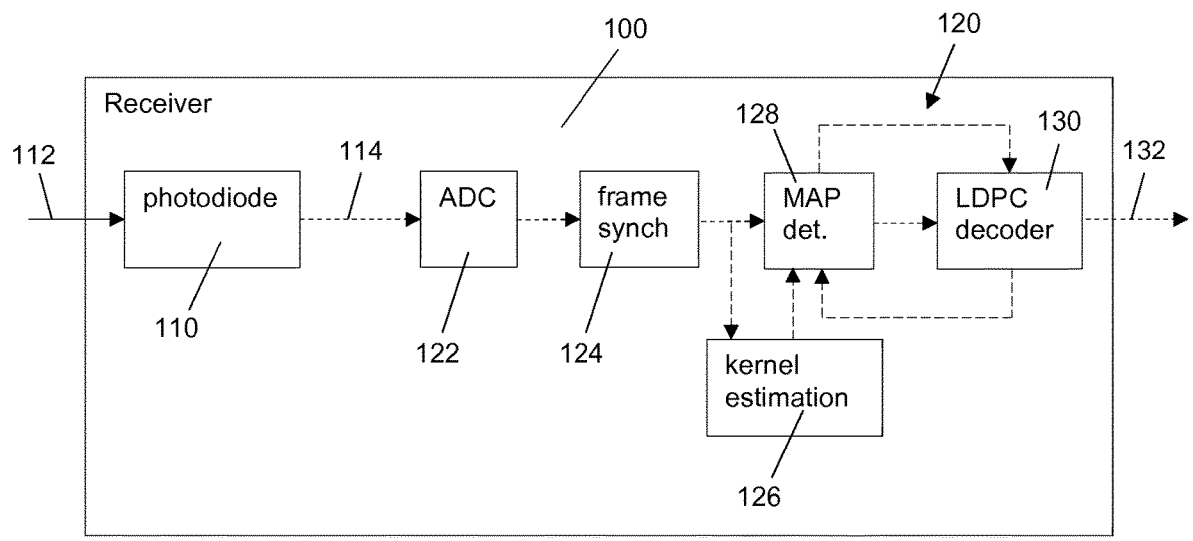
FIG. 7 illustrates optical receiver apparatus according to an embodiment of the disclosure.

FIG. 7 illustrates optical receiver apparatus 100 according to an embodiment of the disclosure. The optical receiver apparatus 100 comprises a photodiode 110, analog to digital conversion, ADC, apparatus 122, frame synchronisation apparatus 124 and symbol determination apparatus 120, 126.

The photodiode 110 is configured to receive an amplitude modulated optical carrier 112, and is configured to perform direct detection of the received amplitude modulated optical carrier to generate a received electrical signal 114. The ADC 122 is configured to perform analog to digital conversion of the received electrical signal 114; the ADC 122 is configured to sample the received electrical signal at a sampling rate of one sample per symbol.

The symbol determination apparatus in this example comprises an iterative decoder 120 and kernel estimation apparatus 126. The iterative decoder 120 is configured to determine received symbols from the received electrical signal using an indication of the nonlinear impulse response of the photodiode, provided by the kernel estimation apparatus 126. The iterative decoder 120 in this example comprises a maximum a posteriori probability, MAP, detector 128 and an LDPC decoder 130. A maximum likelihood sequence, MLS, detector may be used instead of the MAP detector 128 and it will be understood that if a Turbo encoder is used in the transmitter apparatus, a Turbo decoder will be used in place of the LDPC decoder 130 in the receiver apparatus. The decoder 130 is configured to determine and output received symbols 132.

The direct detection scheme makes the transceiver scheme non-linear, due to the photodiode 110 having a quadratic transfer function. This makes necessary calculation of an indication of a nonlinear impulse response of the photodiode for channel estimation. In this example, Volterra kernel coefficients are used for the channel estimation, according to the method reported in W. Chung, "Channel estimation methods based on Volterra kernels for MLSD in optical communication systems," Photonics Technology Letters, IEEE, vol. 22, no. 4, pp. 224-226, 2010.

If L is the channel memory length including the current transmitted symbol, $L \cdot (L+1)/2$ Kernel coefficients (Kernel's dimension) need to be estimated in order to determine the current transmitted symbol. This is because each coefficient depends on two symbols, due to the channel non-linearity caused by the photodiode, and because the coefficients have a Hermitian symmetry (otherwise their number would be L·L). As it will be appreciated by the skilled person, the channel estimation requires a training sequence, hundreds of symbols long.

By using the estimated Kernel coefficients for the nonlinear impulse response of the photodiode, it is possible to calculate 2L received waveforms (one for each possible transmitted bit sequence, i.e. symbol) that are then used by the iterative decoder in order to determine the actual transmitted symbol.

Compared to a coherent receiver, neither frequency and phase estimation nor equalization are needed, making the receiver apparatus 100 energy efficient.

Figure 8:
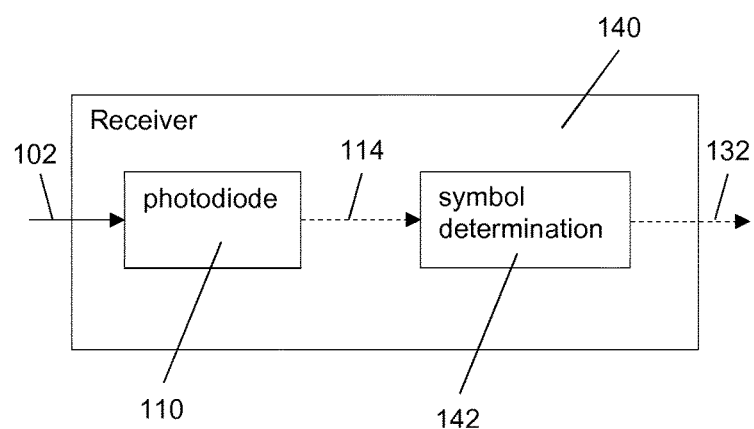
FIG. 8 illustrates optical receiver apparatus according to an embodiment of the disclosure.

FIG. 8 illustrates optical receiver apparatus 140 according to an embodiment of the disclosure. The optical receiver apparatus 100 comprises a photodiode 110 and symbol determination apparatus 142.

The photodiode 110 is configured to receive an amplitude modulated optical carrier 112 carrying a communication signal comprising symbols and having a bandwidth less than a Nyquist bandwidth of the symbols. The photodiode 110 is configured to perform direct detection of the received amplitude modulated optical carrier to generate a received electrical signal 114. The symbol determination apparatus 142 is configured to determine received symbols from the received electrical signal using an indication of a nonlinear impulse response of the photodiode.

In an embodiment, the symbol determining apparatus 142 comprises one of a maximum a posteriori, MAP, detector and a maximum likelihood sequence, MLS detector.

Figure 9:
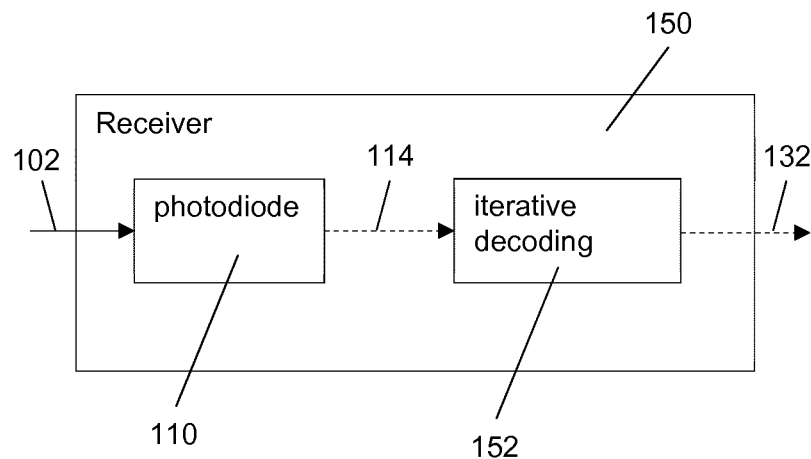
FIG. 9 illustrates optical receiver apparatus according to an embodiment of the disclosure.

FIG. 9 illustrates optical receiver apparatus 150 according to an embodiment of the disclosure. The optical receiver apparatus 150 of this embodiment is similar to the optical receiver apparatus 140 of the previous embodiment, with the following modification.

In this embodiment, the symbol determination apparatus comprises iterative decoding apparatus 152. The communication signal symbols are encoded with an error correcting code that enables a maximum achievable spectral efficiency for the amplitude modulation of the optical carrier. The iterative decoding apparatus 152 is configured to perform iterative decoding of the received electrical signal to determine received symbols using the indication of the nonlinear impulse response of the photodiode and the same error correcting code used to encode the symbols.

In an embodiment, the indication of the nonlinear impulse response of the photodiode, used by the iterative decoding apparatus 152, is based on two consecutive transmitted symbols. The indication of the nonlinear impulse response of the direct detection may comprise coefficients of the nonlinear impulse response of the direct detection. In an embodiment, the coefficients of the nonlinear impulse response of the direct detection are Volterra series kernel coefficients.

Figure 10:
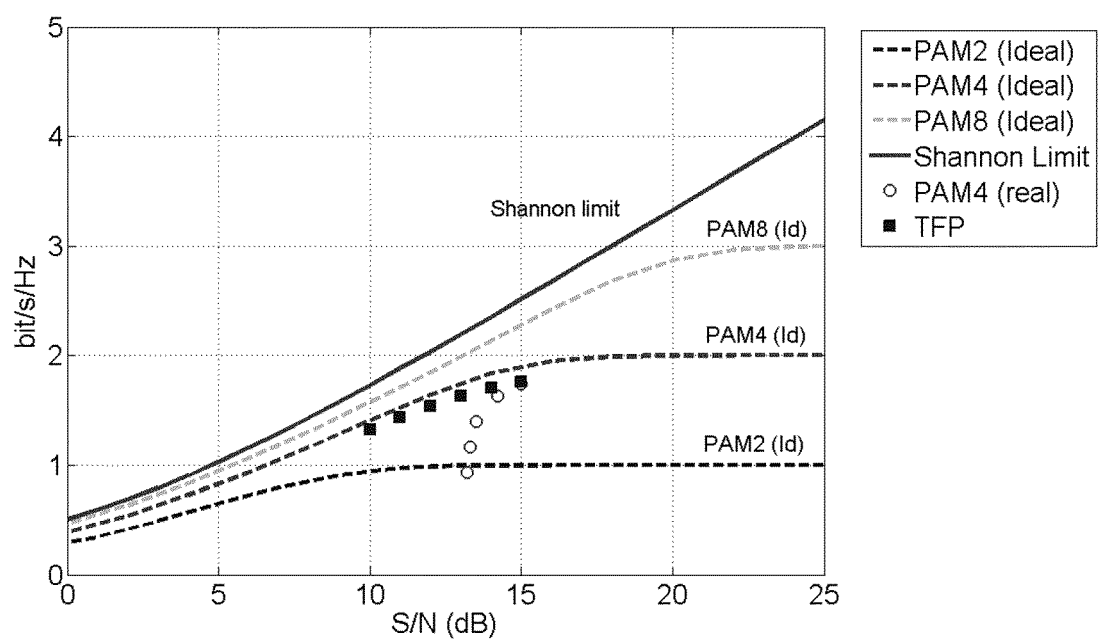
FIG. 10 shows spectral efficiency, bit/s/Hz, as a function of signal to noise ratio, S/N, for TFP for IM/DD using the receiver of FIG. 6 compared with theoretical curves for ideal pulse-amplitude-modulation, PAM-2, PAM-4 and PAM-8.

Referring to FIG. 10, simulations have been conducted based on the transceiver scheme of FIG. 1 to compare TFP for IM/DD according to an example of the present disclosure (labelled as 'TFP') and PAM4, evaluating net spectral efficiency, η, vs the electrical signal to noise ratio at the receiver, S/N. The net spectral efficiency is defined as the ratio of the bit rate of transmitted information data (not including any overhead) and the transmission bandwidth. Any gain in S/N or spectral efficiency compared to PAM-4 can be considered as an equivalent gain of link budget or bit rate, respectively.

FIG. 10 shows as reference theoretical curves for ideal PAM-2, PAM-4 and PAM-8 (dashed lines) and the Shannon limit (solid line). To evaluate performance in a realistic scenario, a fixed bandwidth as low as 4 GHz was used for both the transmitter apparatus 200 and the receiver apparatus 100, and the highest achievable spectral efficiency was calculated for TFP (by means of achievable bit rate lower bounds, as reported in G. Colavolpe and T. Foggi, "Time-frequency packing for high capacity coherent optical links," IEEE Trans. Commun., vol. 62, pp. 2986-2995, August 2014) and PAM-4 (considering a variable line rate and 7% hard-decision forward-error-correction, HD-FEC, with a pre-FEC bit-error-rate, BER, of 1E-3).

Successful error free operation was also experimentally demonstrated by using a low-cost commercial 4 GHz direct-modulated VCSEL as the E-O modulator 208 at the transmitter apparatus 200 and an avalanche photodiode, APD, as the photodiode 110 at the receiver apparatus 100, resulting in a net bit rate of 12.5 Gb/s, which is three times higher than the employed VCSEL nominal speed (referred to OOK modulation). The amplitude modulated carrier signal 112 was successfully transmitted over 25 km of SMF 220 with a 19-dB power budget and energy consumption of 3.4 pJ/bit including thermal management. A net bit rate of 9.2 Gb/s was achieved for 45 km of SMF 220 with a 16-dB power budget. TFP was performed at the receiver apparatus by a low-complexity DSP (L=2) unit as the kernel estimation apparatus 126, and low-pass-filtering of the 14 Gb/s (gross bit rate) electrical communications signal 202 was implemented at the transmitter apparatus by the limited bandwidth of the VCSEL.

Figure 11:
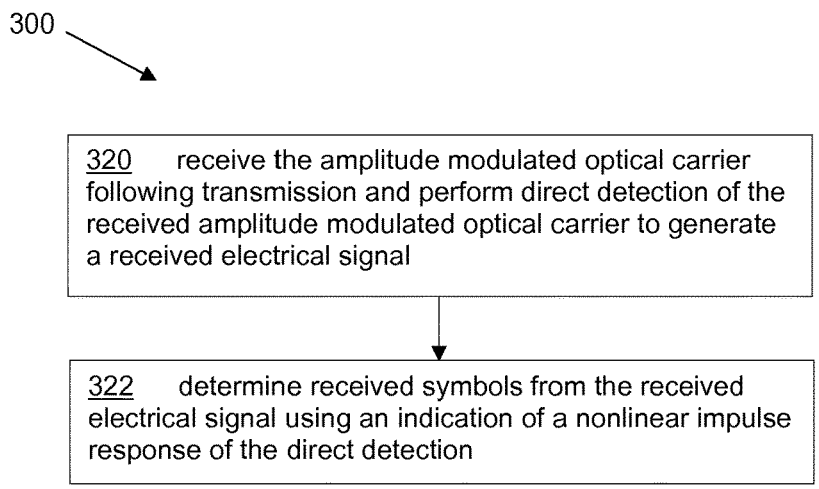
FIG. 11 illustrates steps of a method of receiving an amplitude modulated optical carrier according to an embodiment of the disclosure.

FIG. 11 illustrates steps of a method 300 according to an embodiment of the disclosure of receiving an amplitude modulated optical carrier carrying a communication signal comprising symbols and having a bandwidth less than a Nyquist bandwidth of the symbols.

The method comprises performing (320) direct detection of the received amplitude modulated optical carrier to generate a received electrical signal. The method further comprises determining (322) received symbols from the received electrical signal using an indication of a nonlinear impulse response of the direct detection.

Figure 12:
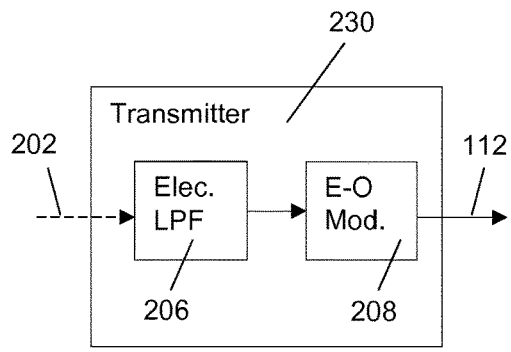
FIG. 12 illustrates optical transmitter apparatus according to an embodiment of the disclosure.

FIG. 12 illustrates optical transmitter apparatus 230 according to an embodiment of the disclosure. The optical transmitter apparatus 230 comprises an electrical low pass filter, LPF, 206, and an electro-optic, E-O, modulator, 208.

The electrical LPF 206 is configured to receive a communication signal 202 comprising symbols for transmission and to perform electrical low-pass filtering to reduce a bandwidth of the symbols to less than a Nyquist bandwidth of the symbols. The E-O modulator 208 is configured to perform amplitude modulation of an optical carrier with the low-pass filtered communication signal to generate an amplitude modulated optical carrier 112. The E-O modulator may, for example, be a direct modulated laser, such as a vertical cavity side emitting laser, VCSEL. In some examples, the optical carrier may be generated (e.g. by a laser) and then modulated, or an optical carrier generator (e.g. laser) is directly modulated to generate the amplitude modulated optical carrier. Either method may be referred to as performing amplitude modulation of an optical carrier, e.g. performing linear amplitude modulation of an optical carrier.

Figure 13:
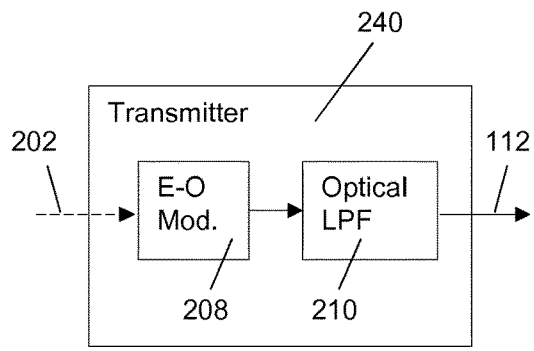
FIG. 13 illustrates optical transmitter apparatus according to an embodiment of the disclosure.

FIG. 13 illustrates optical transmitter apparatus 240 according to an embodiment of the disclosure. The optical transmitter apparatus 230 comprises an E-O modulator 208 and an optical LPF 210.

The E-O modulator may, for example, be a direct modulated laser, such as a vertical cavity side emitting laser, VCSEL. In some examples, the optical carrier may be generated (e.g. by a laser) and then modulated, or an optical carrier generator (e.g. laser) is directly modulated to generate the amplitude modulated optical carrier. Either method may be referred to as performing amplitude modulation of an optical carrier, e.g. performing linear amplitude modulation of an optical carrier. The optical LPF 210 is configured to perform optical low-pass filtering of the amplitude modulated optical carrier to reduce its optical bandwidth, since the E-O modulator (e.g. VCSEL) may have a low modulation bandwidth.

Figure 14:
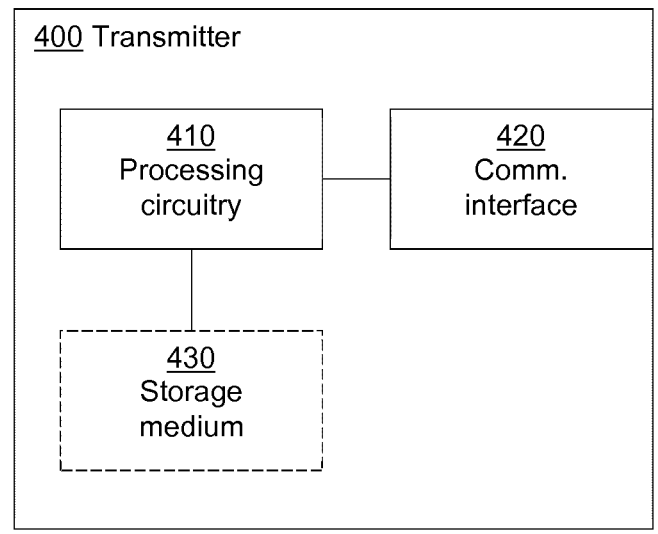
FIG. 14 illustrates an optical transmitter according to an embodiment of the disclosure.

FIG. 14 schematically illustrates, in terms of a number of functional units, the components of an optical transmitter 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product, e.g. in the form of a storage medium 430. The processing circuitry 410 may further be provided as at least one application specific integrated circuit (ASIC), or field programmable gate array (FPGA).

Particularly, the processing circuitry 410 is configured to cause the optical transmitter 400 to perform a set of operations, or steps, 14, 16, 18, 32, 34, 36, 52, 62, 64 as disclosed above. For example, the storage medium 430 may store the set of operations, and the processing circuitry 410 may be configured to retrieve the set of operations from the storage medium 430 to cause the optical transmitter 400 to perform the set of operations. The set of operations may be provided as a set of executable instructions. Thus, the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The optical transmitter may further comprise a communications interface 420 for communications at least with an E-O modulator 208 and at least one of an electrical LPF 206 and an optical LPF 210. As such the communications interface 420 may comprise one or more transmitters and receivers, comprising analogue and digital components and ports for wireline communications.

The processing circuitry 410 controls the general operation of the optical transmitter 400 e.g. by sending data and control signals to the communications interface 420 and the storage medium 430, by receiving data and reports from the communications interface 420, and by retrieving data and instructions from the storage medium 430. Other components, as well as the related functionality, of the optical transmitter are omitted in order not to obscure the concepts presented herein.

Figure 15:
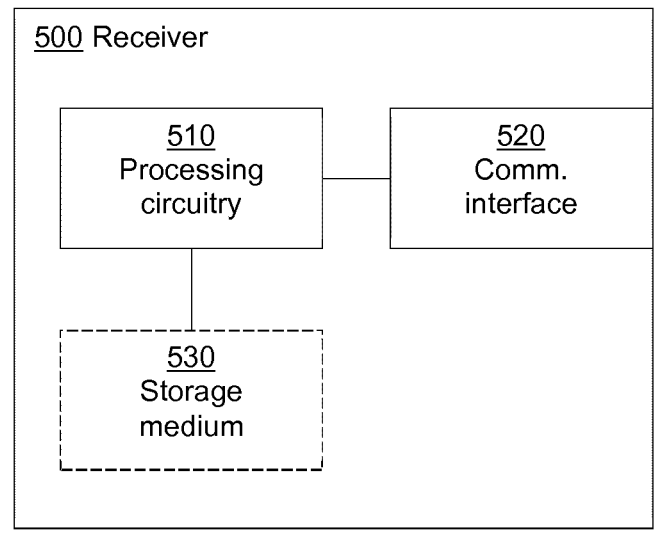
FIG. 15 illustrates an optical receiver according to an embodiment of the disclosure.

FIG. 15 schematically illustrates, in terms of a number of functional units, the components of an optical receiver 500 according to an embodiment. Processing circuitry 510 is provided using any combination of one or more of a suitable central processing unit (CPU), multiprocessor, microcontroller, digital signal processor (DSP), etc., capable of executing software instructions stored in a computer program product, e.g. in the form of a storage medium 530. The processing circuitry 510 may further be provided as at least one application specific integrated circuit (ASIC), or field programmable gate array (FPGA).

Particularly, the processing circuitry 510 is configured to cause the optical receiver 500 to perform a set of operations, or steps, 20, 22, 42, 54, 56, 320, 322, as disclosed above. For example, the storage medium 530 may store the set of operations, and the processing circuitry 510 may be configured to retrieve the set of operations from the storage medium 530 to cause the optical receiver 500 to perform the set of operations. The set of operations may be provided as a set of executable instructions. Thus, the processing circuitry 510 is thereby arranged to execute methods as herein disclosed.

The storage medium 530 may also comprise persistent storage, which, for example, can be any single one or combination of magnetic memory, optical memory, solid state memory or even remotely mounted memory.

The optical transmitter may further comprise a communications interface 520 for communications at least with an E-O modulator 208 and at least one of an electrical LPF 206 and an optical LPF 210. As such the communications interface 520 may comprise one or more transmitters and receivers, comprising analogue and digital components and a suitable number of ports for wireline communications.

The processing circuitry 510 controls the general operation of the optical receiver 500 e.g. by sending data and control signals to the communications interface 520 and the storage medium 530, by receiving data and reports from the communications interface 520, and by retrieving data and instructions from the storage medium 530. Other components, as well as the related functionality, of the optical transmitter are omitted in order not to obscure the concepts presented herein.

In an embodiment, the disclosure provides a computer program, comprising instructions which, when executed on at least one processor, cause the at least one processor to perform any of the steps of the above described optical transmission method 10, 30, 40, 50.

In an embodiment, the disclosure provides a data carrier having computer readable instructions embodied therein. The said computer readable instructions are for providing access to resources available on a processor. The computer readable instructions comprise instructions to cause the processor to perform any of the steps of the above described optical transmission method 10, 30, 40, 50.

In an embodiment, the data carrier is a non-transitory data carrier.

The invention claimed is:

1. An optical transmission method comprising:
   receiving a communication signal comprising symbols for transmission;
   performing amplitude modulation of an optical carrier with the communication signal to generate an amplitude-modulated optical carrier;
   performing low-pass filtering to reduce a bandwidth of the amplitude-modulated optical carrier to less than a Nyquist bandwidth of the symbols;
   transmitting the amplitude-modulated optical carrier;
   receiving the amplitude-modulated optical carrier following transmission and performing direct detection of the received amplitude-modulated optical carrier to generate a received electrical signal; and
   determining received symbols from the received electrical signal using an indication of a nonlinear impulse response of the direct detection and without performing equalization following the direct detection, wherein the indication of the nonlinear impulse response comprises Volterra series kernel coefficients of the nonlinear impulse response.

2. The method of claim 1, wherein the indication of the nonlinear impulse response is based on two consecutive transmitted symbols.

3. The method of claim 1, further comprising encoding the symbols using an error correcting code that enables a maximum achievable spectral efficiency for the amplitude modulation and the direct detection, wherein the amplitude-modulated carrier is generated based on the encoded symbols.

4. The method of claim 3, wherein determining received symbols comprises performing iterative decoding of the received electrical signal based on the indication of the nonlinear impulse response and the error correcting code used to encode the symbols.

5. An optical receiver apparatus for an optical transmission system, the optical receiver apparatus comprising:
   a photodiode configured to:
      receive an amplitude-modulated optical carrier, wherein the amplitude-modulated optical carrier carries a communication signal comprising symbols and has a bandwidth less than a Nyquist bandwidth of the symbols, and
      perform direct detection of the received amplitude-modulated optical carrier to generate a received electrical signal; and
   a symbol determination apparatus configured to determine received symbols from the received electrical signal using an indication of a nonlinear impulse response of the photodiode and without performing equalization following the direct detection, wherein the indication of the nonlinear impulse response comprises Volterra series kernel coefficients of the nonlinear impulse response.

6. The optical receiver apparatus of claim 5, wherein the indication of the nonlinear impulse response is based on two consecutive transmitted symbols.

7. The optical receiver apparatus of claim 5, wherein:
   the symbols are encoded with an error correcting code that enables a maximum achievable spectral efficiency for the amplitude modulation; and
   the symbol determination apparatus comprises an iterative decoding apparatus configured to perform iterative decoding of the received electrical signal based on the indication of the nonlinear impulse response and the error correcting code used to encode the symbols, thereby determining the received symbols.

8. The optical receiver apparatus of claim 7, wherein the symbol determination apparatus further comprises a kernel estimation apparatus configured to generate Volterra series kernel coefficients comprising the non-linear impulse response.

9. The optical receiver apparatus of claim 8, wherein the Volterra series kernel coefficients are used by the iterative decoding apparatus to determine the received symbols.

10. A method of receiving an amplitude modulated optical carrier carrying a communication signal comprising symbols and having a bandwidth less than a Nyquist bandwidth of the symbols, the method comprising:
    performing direct detection of the received amplitude modulated optical carrier to generate a received electrical signal; and
    determining received symbols from the received electrical signal using an indication of a nonlinear impulse response of the direct detection and without performing equalization following the direct detection,
    wherein determining the received symbols comprises:
       generating Volterra series kernel coefficients comprising the non-linear impulse response; and
       iteratively decoding the received electrical signal based on the Volterra series kernel coefficients and an error correcting code used to encode the symbols.

11. An optical receiver for receiving an amplitude modulated optical carrier carrying a communication signal, the communication signal comprising symbols and having a bandwidth less than a Nyquist bandwidth of the symbols, the optical receiver comprising processing circuitry configured to control operations corresponding to the method of claim 10.

* * * * *